July 9, 1929.　　　　C. G. HAWLEY　　　　1,720,178
AIR PURIFIER AND MOISTENER
Filed Dec. 4, 1925
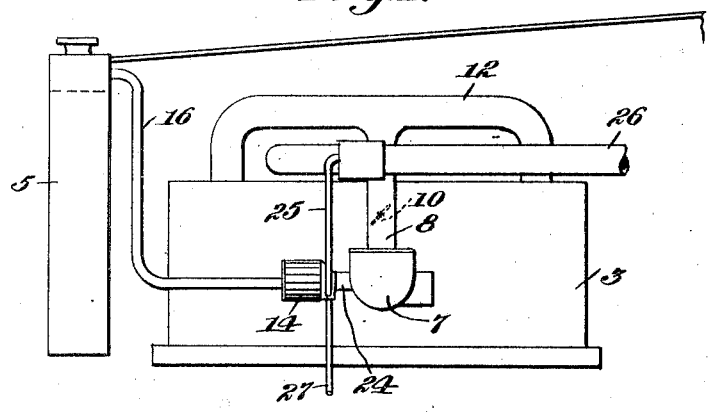
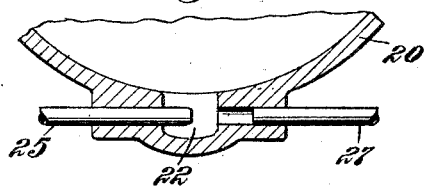
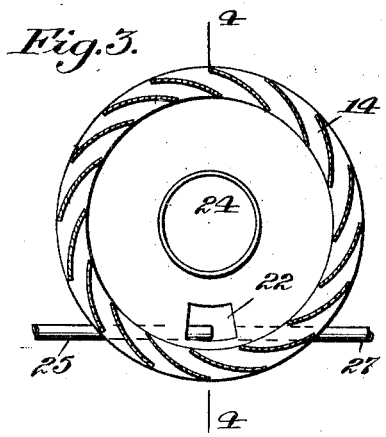
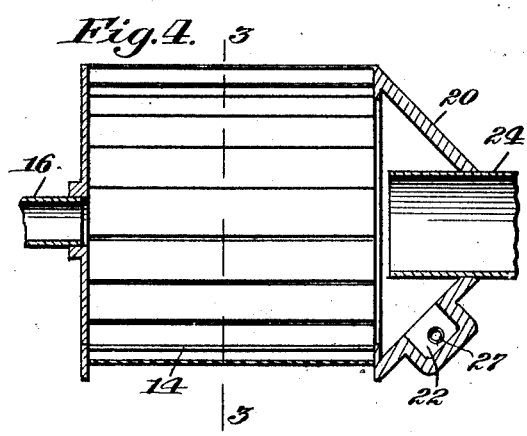
Inventor:
Charles Gilbert Hawley, Patented July 9, 1929.

1,720,178

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

AIR PURIFIER AND MOISTENER.

Application filed December 4, 1925. Serial No. 73,281.

This invention relates to purifying and moistening devices for the intake air of carburetors, and the like, for use with internal combustion engines.

The purpose of the invention is, first, to purify the incoming air which is mixed with the vaporized hydrocarbon to form a combustible fuel for internal combustion engines, such vaporizing and mixing of the air to form the fuel being ordinarily performed by a carburetor, in connection with which this device may be, and preferably will be used.

The invention not only separates the mechanical impurities (dust) from the air, which is a highly-desirable result, as is well known, but, furthermore, introduces a sufficient amount of moisture in connection with the incoming air so that complete and perfect combustion may be accomplished even on dry and hot days, as when the motor is being run in midsummer and the external air is in an ultra-dry condition.

The invention will be best understood from the accompanying drawings, in which,

Fig. 1 is a diagrammatic view illustrating the various parts of the apparatus;

Fig. 2 is an enlarged, sectional, detailed view of a portion of the tuyère ring, and the dust-ejector connection from the exhaust pipe;

Fig. 3 is a transverse sectional view through the tuyère ring; and

Fig. 4 is a vertical sectional view of the tuyère ring and dust-ejecting pocket.

Referring to Fig. 1, which shows diagrammatically certain portions of a motor vehicle, the motor 3 is provided with the usual radiator 5, while a carburetor of any suitable pattern, 7, is fed with fuel in any preferred manner, the fuel being admitted to a chamber 8 in which is located the usual throttle valve 10 for controlling the admission of the fuel to the intake manifold 12, and thence to the motor. These parts are not illustrated in detail as they are, or may be, of common or known construction, and in themselves form no part of the present invention.

The air purifying and cleansing device consists of a circumferential series of tangential slit-like tuyères 14, arranged annularly and serving to admit the atmospheric air in a plurality of tangential jets or sheets, under the suction or low pressure created by the motor, such jets or films of air being caused to set up a whirling motion within the body of the tuyères 14. Thus the dust is separated from the air. A pipe 16 leads from the water space preferably above the normal level of the water in the radiator 5, into the center of the space surrounded by the annular series of tuyères 14, and conducts air, or vapor, which is more or less heated, and contains a sufficient amount of moisture to aid complete vaporization and combustion, such moistened air being caused to mingle with the whirling body of air within the tangential tuyères 14.

As an important incident, the moisture from the radiator, or other source, wets the inner surfaces of the tuyère ring and ensures the perfectness of the dust-separating action of the apparatus.

The exit portion of the tuyère ring 14 is provided with a preferably tapering end wall 20, which contains a pocket 22. A pipe 25 is connected at one end with the exhaust manifold 26, and the other end of said pipe opens into the central portion of the pocket 22. A discharge pipe 27 has one end open and in suitable proximity with the discharge end of the pipe 25, so that hot gas under pressure from the exhaust manifold 26 will pass through the pipe 25 and flow through the pipe 27, thereby creating a high vacuum and an ejecting action at this point which removes the heavier particles, such as dust, dirt, and other foreign matter, which have been separated from the air through the centrifugal action of the whirling films admitted by the tuyères 14, thus removing from the incoming air all of such impurities. In this connection it is desired to state that the centrifugal action of the incoming air through the slit-like openings of the tuyères 14 causes the heavier particles to be deposited in the chamber formed by the wall 20, and below the lower openings of the tuyères (see Fig. 4), so that the ejecting action of the pipe 25 is free to remove all of such foreign matter which has thus been separated from the air, so that such air will be in a highly purified condition when it passes into the chamber 8 to be mixed with the incoming vaporized fuel; and, at the same time the pipe 16 will admit a sufficient amount of moisture to such air to promote vaporization, and increase the efficiency of the engine.

Having thus described my invention, what I claim as new and desire to secure by U. S. Letters Patent is:—

1. The process of purifying air for use in internal combustion engines which comprises sub-dividing the incoming air into a plurality of circumferential tangential films to set up a whirling motion and separate the heavier impurities from said air, and ejecting said impurities from the vicinity of such whirling action by means under pressure derived from the exhaust of the motor.

2. A device for purifying air for use in the carburetors of internal combustion engines, comprising a circumferential series of tangential tuyères for subdividing the incoming air into a series of tangential films, thus setting up a whirling action within said tuyères and separating the impurities from the air, and an ejecting device operated from the pressure of the escaping gases of the exhaust for discharging such impurities.

3. An apparatus for purifying air for use in internal combustion engines, comprising a circumferential series of slit-like tangential tuyères for separating impurities from the incoming air, a chamber adjacent said tuyères, and an ejecting device operated through pressure derived from the exhaust of the engine for ejecting said impurities from said chamber.

4. An apparatus for purifying air for use in internal combustion engines comprising, in combination, a circumferential series of slit-like tuyères arranged to impart a whirling action to the incoming air and separate the impurities therefrom, means for admitting moistened air to the interior of the whirling body, and ejecting means operated from pressure derived from the exhaust for discharging the impurities from said tuyères.

5. An apparatus of the class described comprising, in combination, a centrifugal unit embodying a plurality of tangential slit-like tuyères for receiving impure air to be mixed with the fuel of an internal combustion engine, ejecting means operated by pressure derived from the hot exhaust of the engine for discharging the impurities from the neighborhood of said tuyères, means for conducting the purified air together with vaporized fuel to the motor, and means for controlling the mixture of air and fuel.

6. An apparatus for purifying air for use in internal combustion engines, comprising, in combination, a circumferential series of slit-like tuyères arranged to impart whirling action to the incoming air and separate the dust therefrom, an axial outlet for the whirling purified air, an aqueous fluid inlet axially opposed to said outlet, and means for the discharge of the collected dust and an excess of aqueous fluid.

In testimony whereof, I have hereunto set my hand this 2nd day of December A. D. 1925.

CHARLES GILBERT HAWLEY.